US 8,065,227 B1

(12) United States Patent
Beckman

(10) Patent No.: US 8,065,227 B1
(45) Date of Patent: Nov. 22, 2011

(54) METHOD AND SYSTEM FOR PRODUCING CUSTOM BEHAVIOR SCORES FOR USE IN CREDIT DECISIONING

(75) Inventor: Dennis G. Beckman, Phoenix, AZ (US)

(73) Assignee: Bank of America Corporation, Charlotte, NC (US)

( * ) Notice: Subject to any disclaimer, the term of this patent is extended or adjusted under 35 U.S.C. 154(b) by 1475 days.

(21) Appl. No.: 10/709,797

(22) Filed: May 28, 2004

Related U.S. Application Data

(60) Provisional application No. 60/533,549, filed on Dec. 31, 2003.

(51) Int. Cl.
*G06Q 40/00* (2006.01)
(52) U.S. Cl. ........................................................ 705/39
(58) Field of Classification Search .................... 705/39
See application file for complete search history.

(56) References Cited

U.S. PATENT DOCUMENTS

| | | | | |
|---|---|---|---|---|
| 5,619,709 | A * | 4/1997 | Caid et al. | 715/209 |
| 5,940,812 | A * | 8/1999 | Tengel et al. | 705/38 |
| 6,064,987 | A * | 5/2000 | Walker et al. | 705/38 |
| 6,128,599 | A * | 10/2000 | Walker et al. | 705/14 |
| 6,233,566 | B1 * | 5/2001 | Levine et al. | 705/36 R |
| 6,513,018 | B1 | 1/2003 | Culhane | |
| 7,280,980 | B1 * | 10/2007 | Hoadley et al. | 705/38 |
| 7,376,603 | B1 * | 5/2008 | Mayr et al. | 705/35 |
| 7,376,618 | B1 * | 5/2008 | Anderson et al. | 705/38 |
| 7,418,431 | B1 * | 8/2008 | Nies et al. | 706/21 |

OTHER PUBLICATIONS

Euclidean geometry, Britannica online, available @ http://www.britannica.com/EBchecked/topic/194901/Euclidean-geometry#tab=active~checked%2Citems~checked&title=Euclidean%20geometry%20—%20Britannica%20Online%20Encyclopedia, last accessed Jun. 22, 2008.*
Rosenberg et al., Quantitative methods in credit Management, Operations research, vol. 42, No. 4 (Jul.-Aug. 1994), pp. 589-563, available @ http://www.jstor.org/sici?sici=0030-364X(199407%2F08)42%3A4%3C589%3AQMICMA%3E2.0.CO%3B2-F, last accessed Jun. 21, 2008.*
Behavior Scoring Model, Portfolio Management Services, Available @ http://web.archive.org/web/20030628085204/www.predictivemetrics.com/portfolio.html, last accessed Jun. 22, 2008.*
CFA, Credit Score Accuracy and Implications for Consumers, Dec. 17, 2002, pages available online @ http://www.consumerfed.org/pdfs/121702CFA_NCRA_Credit_Score_Report_Final.pdf, last accessed Feb. 28, 2009.*
Sahadi, Jeanne, Improve your credit score, Feb. 15, 2002, pp. 1-4, available online @ http://money.cnn.com/2002/02/15/debt/q_fivethings_creditscore/, last accessed Feb. 28, 2009.*

* cited by examiner

*Primary Examiner* — Mary Cheung
*Assistant Examiner* — Daniel L Greene
(74) *Attorney, Agent, or Firm* — Michael A. Springs; Moore & Van Allen PLLC; Ryan P. Harris

(57) ABSTRACT

Method and system for producing custom behavior scores for use in credit decisioning. A custom credit score takes into account credit bureau attributes and relatively detailed transaction attributes as well as traditional masterfile information for a customer applying for credit on an account. To determine the custom score, accounts at the financial institution are segmented. Segments can be created by grouping accounts into a plurality of clusters based on Euclidean distances between points in a multi-dimensional space, as well as in other ways. The customer's credit score is determined according to a behavior model created for a particular segment of accounts into which the customer's account falls.

23 Claims, 13 Drawing Sheets

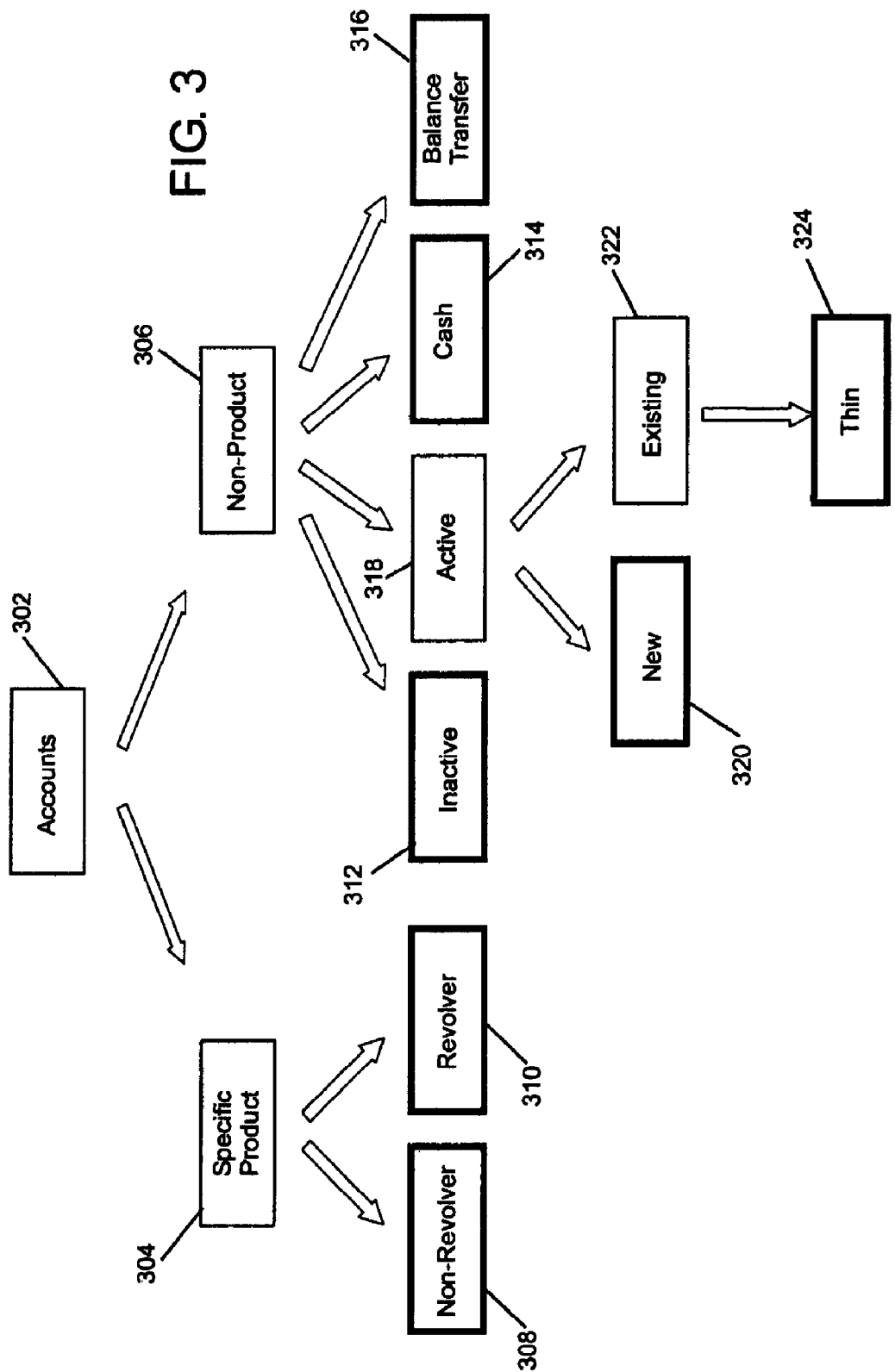

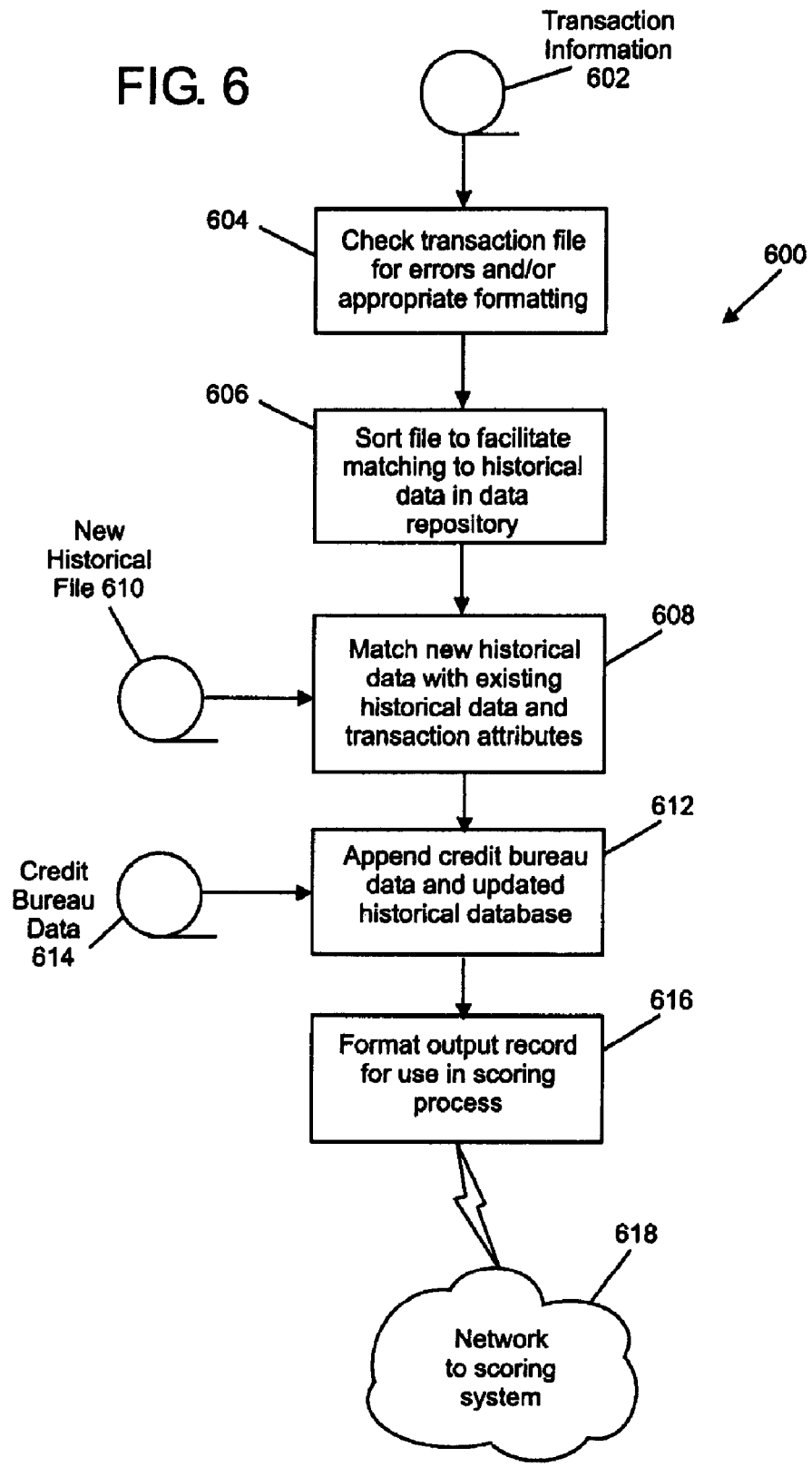

FIG. 8A

| 802 Attribute Name | 804 Intervals | 806 Points Assigned | 808 Segment Population Distribution | 810 Average Points (Expected Value) | 812 Interval Bad Rate | 814 Model Explanatory Power |
|---|---|---|---|---|---|---|
| Constant  816 | To be added automatically to each score | | | | | |
| Masterfile Information | | | | | | |
| Ratio of Current Balance to Credit Limit in Cycle 1  818 | Missing<br>Negative Ratios<br>0%<br>1% to 90%<br>91% to 97%<br>98% to 100%<br>101% or More | | | | | |
| | Total | | | | | |
| Ratio of Payment in Cycles 1-3 to Balance in Cycles 2-4  820 | Missing<br>Balance in Cycles 2-4 <= 0<br>0%<br>1% to 3%<br>4% to 27%<br>28% or More | | | | | |
| | Total | | | | | |

| Credit Bureau Information | | | | | | | |
|---|---|---|---|---|---|---|---|
| Number of inquiries in the Last 12 Months<br><br>822 | Missing<br>-5 Trades Only<br>-3 Trades and Public Record Only<br>0<br>1 to 3<br>4<br>5 to 8<br>9 or More | | | | | | |
| | Total | | | | | | |
| Months Since Most Recent 30 DPD Trade<br><br>824 | Missing<br>-6 Industry/No Criteria Met<br>0<br>1 to 3 Months<br>4 Months or More | | | | | | |
| | Total | | | | | | |

FIG. 8C

| Transaction Data | | | | | | |
|---|---|---|---|---|---|---|
| Percent of Total Transaction Amount in Cycles 1-6- Convenience Checks<br><br>826 | No Transaction Data Returned<br>0%<br>1% or More | | | | | |
| | Total | | | | | |
| Amount of High Level Cash Transactions in Cycles 1-6<br><br>828 | No Transaction Data Returned<br>$0<br>$1 to $100<br>$101 or More | | | | | |
| | Total | | | | | |

800

| FIG. 8A |
|---|
| FIG. 8B |
| FIG. 8C |

| Attribute Name | Intervals | Points Assigned | Segment Population Distribution | Average Points (Expected Value) | Interval Bad Rate | Model Explanatory Power |
|---|---|---|---|---|---|---|
| Constant 916 | To be added automatically to each score | | | | | |
| Masterfile Information | | | | | | |
| Ratio of Average Payment to Balance in Cycles 1-6 919 | Missing Balance and Payments are Missing Balance and Payments <=$0 Sum of Balances <=$0 0% 1 to 20% 21% or More | | | | | |
| | Total | | | | | |
| Ratio of Balance to Credit Limit in Cycles 1-6 920 | Missing Balances Less Than 0% 0% 1% to 45% 45% or More | | | | | |
| | Total | | | | | |

FIG. 9B

| Credit Bureau Information | | | | | | |
|---|---|---|---|---|---|---|
| Number of Inquiries in the Last 12 Months<br><br>922 | Missing<br>-5 Trades Only<br>-4 Public Records Only<br>-3 Trades & Public Record Only<br>-2 No Credit Bureau Match<br>0<br>1<br>2<br>3 to 4<br>5 to 6<br>7 to 9<br>10 or More | | | | | |
| | Total | | | | | |
| Age of Oldest Trade<br><br>925 | Missing<br>-6 Industry/No Criteria Met<br>-5 Inquiries Only<br>-4 Public Records Only<br>-3 Inquires and Public Record Only<br>-2 No Credit Bureau Match<br>-1 No Trades This Industry/ Trade Exclusion | | | | | |

FIG. 9C

| | Transaction Data | | | | | |
|---|---|---|---|---|---|---|
| Number of Cycles Since Most Recent Transaction in Cycle 1-6-T&E<br>927 | No Transaction Data Returned | | | | | |
| | No Transactions of this Type | | | | | |
| | 1 Cycle | | | | | |
| | 2 Cycles or More | | | | | |
| | Total | | | | | |
| Number of High Level Frivolous Transactions in Cycles 1-6<br>929 | No Transaction Data Returned | | | | | |
| | 0 | | | | | |
| | 1 to 20 | | | | | |
| | 21 to 45 | | | | | |
| | 46 or More | | | | | |
| | Total | | | | | |

| 1 to 24 Months | 25 to 48 Months | 49 to 84 Months | 85 to 156 Months | 157 Months or More | Total |
|---|---|---|---|---|---|
| | | | | | |

↙ 900

METHOD AND SYSTEM FOR PRODUCING CUSTOM BEHAVIOR SCORES FOR USE IN CREDIT DECISIONING

CROSS REFERENCE TO RELATED APPLICATIONS

This application claims priority from co-pending, provisional patent application No. 60/533,549, filed Dec. 31, 2003 by the inventor hereof, the entire disclosure of which is incorporated herein by reference.

BACKGROUND OF INVENTION

Loaning money is a central processing the banking industry. The process banks follow when making a decision as to whether or not to loan money to an entity or individual is often related to a credit score. In a typical scenario, a bank scores the applicant and compares that score to some pre-determined cutoff score. The cutoff score is determined for each type of credit offered by the bank. The applicant's score is determined by several factors depending on the type of credit requested.

The credit scoring process results in a number (in practice, an integer) that represents the credit worthiness of an account based on the credit history of the applicant. The cutoff score is chosen with the help of a credit scorecard (in chart or table form) that is developed using a broad range of data about "pass" rates and "bad" rates for a particular type of loan. The credit scorecard and data may be specific to the financial institution involved, or the credit scorecard and data may be generic and use industry-wide data.

One use of a credit scorecard involves reviewing a list of scores in sequence, an estimation of what percentage of applicants will have scores above that score (pass rate), and an estimation of what percentage of the loans to applicants with scores above that cutoff score will go delinquent sometime during the life of the loan (bad rate). A portion of a hypothetical scorecard 100 is illustrated in FIG. 1. The central rows of the scorecard are omitted for clarity. Column 102 shows the scores, column 104 shows the number of applications in the sample on which the scorecard is based that fall into the score range identified by the score, column 106 shows the cumulative number, and column 108 shows the cumulative percentage (pass rate). Columns 110, 112, and 114 show the percent bad rate, number of bad applications, and cumulative percentage of bad applications (bad rate) for a score, respectively. Note that the first row includes all scores below a particular score, which has been identified as the lowest score the bank is interested in with respect to potential loan candidates. The general format, use, and meaning of credit scores and credit scorecards are well understood by individuals in the financial loan industry.

With respect to an individual's credit score, financial institutions can use a score assigned by a credit bureau or credit-reporting agency. However, sophisticated loan companies and banks often find it advantageous to develop their own custom credit scores, which are arrived at by taking into account information which the particular financial institution has found to have bearing on the creditworthiness of customers in their particular market or business environment for a given type of loan. This information may include what is known in the industry as "masterfile" data, which can include summary information about a customer's relationship with the financial institution. In such a case, a bank or other financial institution can calculate scores themselves, or provide information to an outside contractor for use in calculating and supplying custom scores. As an example, Total System Services, Inc., or "TSYS" of Columbus, Ga., U.S.A., provides custom scoring services to banks via their SCOREadvantage™ product, typically using information supplied by the contracting financial institution, and in a manner specified by the financial institution.

SUMMARY OF INVENTION

The present invention, described by way of example embodiments, provides a way to determine a custom credit score for an individual. The custom score determined according to at least some embodiments of the invention takes into account at least some credit bureau attributes, relatively detailed transaction attributes, traditional masterfile information, and combinations thereof for a customer applying for credit on an account. The score is determined according to a behavior model created for a particular group of account types into which the customer's account falls, thus it can be referred to herein as a "custom behavior score" or "custom behavior credit score." A group of accounts in example embodiments of the invention can be referred to as a "segment" of accounts, and the process of grouping the accounts into segments can be referred to as "segmentation" of the accounts.

A method of producing a custom behavior score according to at least some embodiments of the invention includes updating a plurality of custom behavior models, wherein each custom behavior model may include masterfile attributes, credit bureau attributes, and transaction attributes or combinations of these attributes. Each custom behavior model corresponds to one of a plurality of segments of accounts at the financial institution. The account on which credit is sought is assigned to a segment from among the plurality of segments of accounts at the financial institution. The custom behavior score is determined from the custom behavior model corresponding to the segment to which the account is assigned.

In some embodiments, at least some segments can be determined by grouping accounts into a plurality of clusters based on Euclidean distances between points in a multidimensional space, wherein each point represents one of the plurality of accounts, and each dimension in the multidimensional space represents a transaction, credit bureau or masterfile attribute. In such a case, the assigning of an account to a segment can include determining a Euclidean distance for a point representing the account from a centroid for at least some of the plurality of clusters.

In some embodiments, an account is tested for exclusion from the modeling and scoring process by determining if it meets high-level exclusion criteria. A system can also be set up in which reason indication codes corresponding to at least one or possibly many reason indications can be provided based on weights assigned to at least some of the attributes used in the model for use with the custom behavior score. Such reason indications can allow a user of an embodiment of the invention to make more informed decisions on whether to extend credit than would otherwise be possible with a custom behavior score alone.

In some embodiments, the invention can be implemented via computing platforms and data repositories or databases or a collection of computing platforms and databases interconnected by a network. A computer program product or products containing computer program code with various instructions cause the hardware to carry out, at least in part, the methods of embodiments of the invention. In some embodiments, a system that implements the invention can include apparatus to store and update masterfile attributes, credit bureau attributes, and transaction attributes, and apparatus to produce a plurality of custom behavior models. Programmed apparatus assigns an account to a segment from among the plurality of segments of accounts at the financial institution in order to determine a custom behavior score.

BRIEF DESCRIPTION OF DRAWINGS

FIG. 3 is a simplified schematic illustration of an alternative method to define segments to derive custom behavior models according to at least some embodiments of the invention.

FIG. 6 is a flowchart illustrating how the various types of attributes that make up the custom behavior models are aggregated and updated according to at least some embodiments of the invention.

FIG. 8 is an illustration of at least a portion of the structure of an example behavior model derived for a segment defined by the clustering technique according to at least some embodiments of the invention. FIG. 8 is split into FIG. 8A, FIG. 8B, and FIG. 8C for clarity.

FIG. 9 is an illustration of at least a portion of the structure of an example behavior model derived for a segment defined without clustering according to at least some embodiments of the invention. FIG. 9 is split into FIG. 9A, FIG. 9B, and FIG. 9C for clarity.

DETAILED DESCRIPTION

Figure 1:
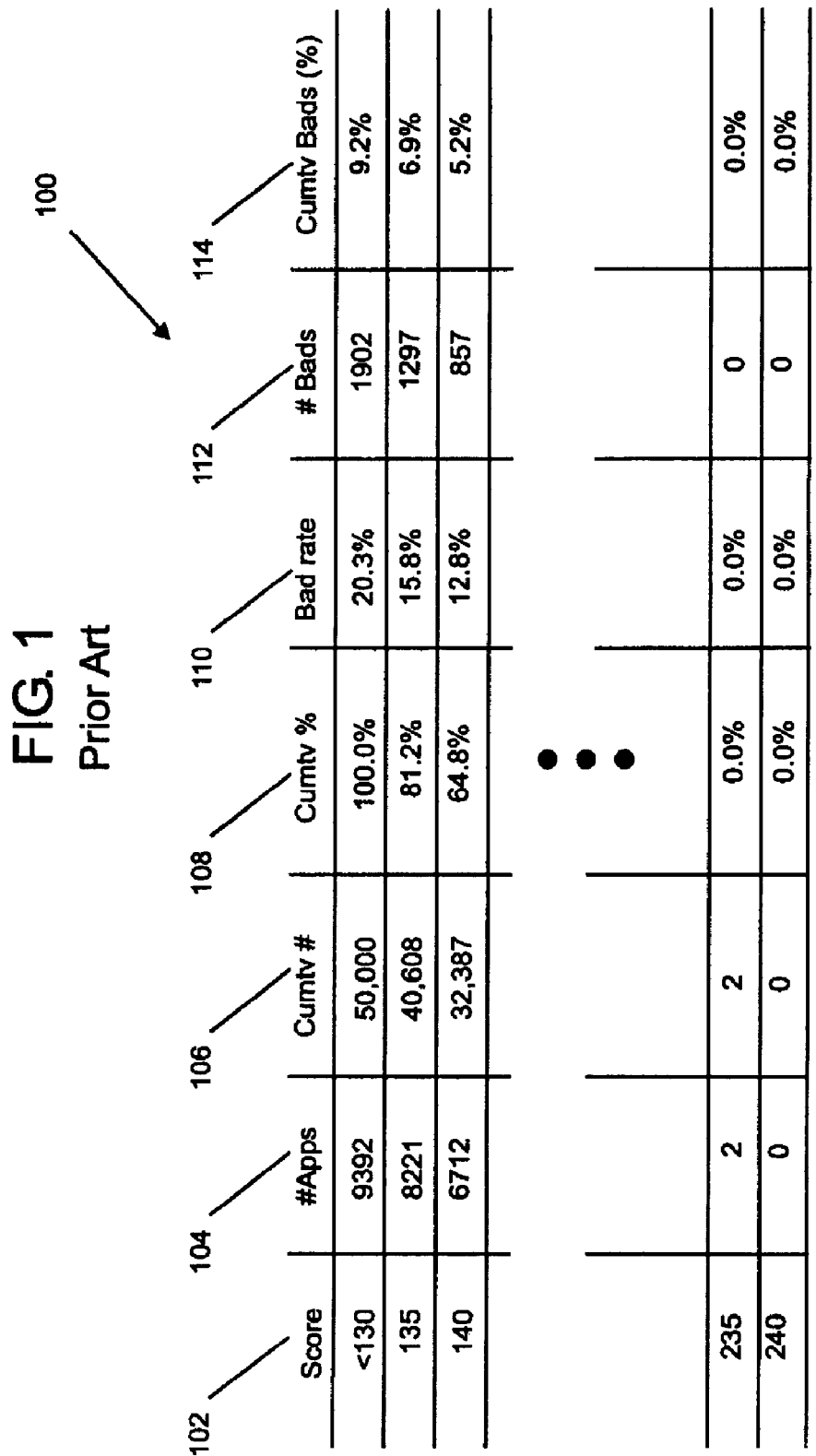
FIG. 1 is an illustration, for purposes of background, of a generic credit scorecard as is known in the art.

The present invention will now be described in terms of specific example embodiments. It is to be understood that the invention is not limited to the example embodiments disclosed. It should also be understood that not every feature of the methods and systems described is necessary to implement the invention as claimed in any one of the appended claims. Also, throughout this disclosure, where a process or method is shown or described, the steps of the method may be performed in any order or simultaneously, unless it is clear from the context that one step depends on another being performed first. Additionally, there can be significant time lag between steps. With respect to flow charts, block diagrams, and flow diagrams, not every possible signal flow, data path or process block is shown. Rather, for clarity, only those important to the inventive concepts being discussed relative to the drawing may be illustrated, although others may be discussed.

As previously discussed, the invention relates to producing credit scores for use in loan decisioning. It should be understood that terms like "bank," "financial institution," and just "institution" are used herein in their broadest sense. Institutions, organizations, or even individuals, that process loans are widely varied in their organization and structure. Terms like bank and financial institution are intended to encompass all such possibilities, including but not limited to, finance companies, stock brokerages, credit unions, mortgage companies, manufacturers who grant loans to secure the purchase of goods, finance companies, computer companies, etc. Additionally, disclosed embodiments may suggest or illustrate the use of agencies or contractors external to the financial institution to perform some of the calculations and data repository services. These illustrations are examples only, and an institution or business can implement the entire invention on their own computer systems or even a single work station if appropriate databases are present and can be accessed.

Embodiments of the invention take advantage of the fact that many financial institutions grant loans to customers with which they already have a relationship. For example, a credit card customer may apply for a larger line of credit, or a mortgage customer may apply for a home equity loan. In such cases, a loan decision must be made on this "new" transaction taking into account many of the same factors that would be considered to make a decision on any new loan. One difference in such a case however, is that the lender does not necessarily have to rely on generic credit information about the consumer. Rather, the lender has its own existing data from which it can learn additional information to help make determinations as to the creditworthiness of the potential borrower. These determinations or information related to such determinations can supplement the other information, which is normally used to obtain a credit score. In example embodiments of the invention, all of this transaction specific data is organized into transaction attributes, which in a sense represents details of the borrower's relationship with the lender. The transaction attributes and/or masterfile attributes, and/or credit bureau attributes for all of the accounts in a given category can be used to segment the accounts into some limited number of groups. These groups can be referred to herein as "segments" and a custom behavior model can be developed for each segment. This model is then used to determine a custom behavior credit score for a consumer or business applying for a loan account, or an additional loan on an existing account. Since the custom behavior model by its very nature takes into account extensive details about the transaction history of the particular loan applicant with the financial institution, this customer behavior score can be a more accurate predictor of the borrower's performance in repaying the loan.

The number of segments used in a particular loan business at a particular institution, and the number of trans-action attributes used to arrive at those segments will vary, and will typically be customized by those of ordinary skill in the art working in their particular institution and industry. For example, if credit card products are under consideration, some transaction attributes will be related to whether balances are paid in full each month, often termed as whether the account "revolves." However, if an automobile loan is being considered, monthly payments are normally required to be made in full; therefore, there might not be any transaction attributes related to the revolving nature of such an account.

Figure 2:
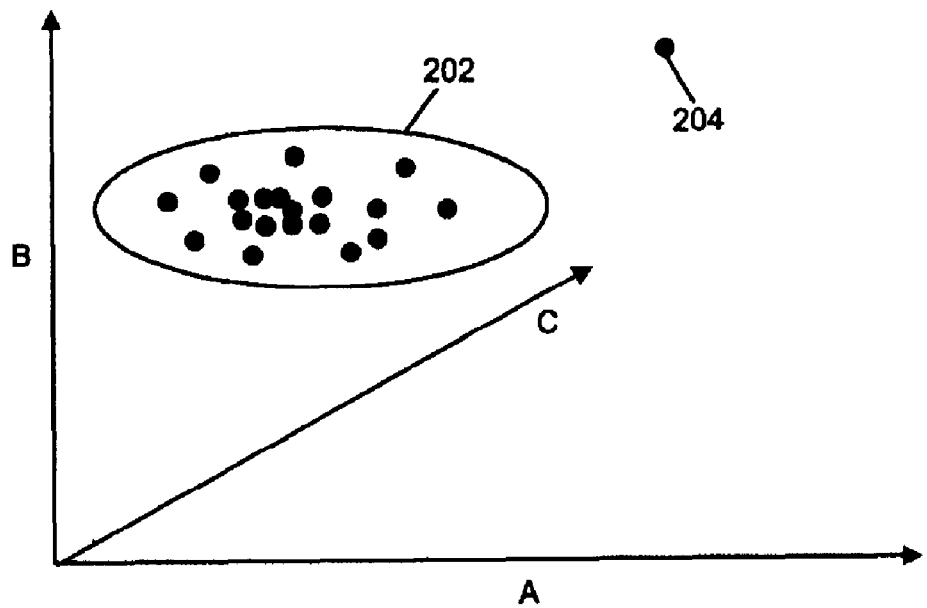
FIG. 2 is a simplified schematic illustration of clustering in order to define segments to derive custom behavior models according to at least some embodiments of the invention.

One way of segmenting accounts for use with the invention is illustrated in FIG. 2. This technique is referred to herein as "clustering" because points representing an account are mapped into a geometric space and form "clusters" of accounts. Using credit card accounts as an example, transaction attributes in such a case can include items such as the amount of balance transfers within some number of billing cycles, and the amount of cash transactions within some number of billing cycles. Other attributes might be related to the number of times an increase in credit has been asked for within a certain period, and numbers specifying the quantity of certain types of transactions during certain billing periods and specific masterfile and credit bureau attributes.

In order to cluster accounts, the appropriate number of attributes can be determined, in part through trial and error. Generally, attributes are sufficiently general in character to describe a broad population, but not so specific so that a single attribute is overly determinative as to an account being in a particular cluster. In order to evaluate a segmentation result, Eigen vectors and their paired Eigen values, as they are known in the art, can be used to determine when a subset of attributes span a similar space. Each account is assigned the appropriate values for its transaction attributes. A point representing each account is then plotted in a multi-dimensional space, where each dimension represents one of the transaction attributes. FIG. 2 illustrates an example with just three transaction attributes for clarity. The three transaction attributes are designated "A," "B," and "C." When points representing accounts are plotted according to their transaction attribute values in the multi-dimensional space formed by axes representing A, B and C, the accounts will tend to form "clusters" in the geometric space. For example, points 202 in FIG. 2 represent a cluster of accounts. Accounts are assigned to a cluster using Euclidean distance calculation.

Clustering via Euclidean distance generally is known and has been applied in other arts. In such a calculation, the Euclidean distance of an account to each of the cluster centroids based on standardized mean values is used to determine the distance of each account to the nearest cluster. By "nearest cluster" what is meant is the one with the minimum distance to the centroid. For example, point 204 of FIG. 2 might be included in the cluster represented by points 202. Alternatively, if the distance is less to another cluster, which is out of view given the scale of the graph in FIG. 2, point 204 might be included in the other cluster. Alternatively, point 204 might be the first account in a new cluster or may form its own cluster. In any case, the distance from each cluster centroid is the square root of the sum of the squared differences between the observation value and the cluster centroid for each clustering variable. The distances to every cluster centroid are compared to determine which cluster has the minimum distance from the observation and the observation is assigned to a cluster with the minimum distances. As previously mentioned, other techniques can be used to segments accounts for purposes of implementing embodiments of the invention.

FIG. 3 illustrates a so-called "waterfall" approach to segmenting accounts. In FIG. 3, boxes enclosed in bold lines represent segments of accounts. Boxes that are not enclosed in bold lines represent intermediate classifications of accounts through which the accounts "fall" like water on their way to their final segment. Again, this general technique is known, and has been applied in other contexts. In the example of FIG. 3, credit card loan products are again considered. Block 302 contains all of the accounts to which this segmentation technique is being applied. These accounts are divided into specific product accounts in block 304, and non-product accounts in block 306. An example of a specific product account that would be recognized by those of ordinary skill in the credit card industry is an account that uses a rewards card with another, typically non-financial, institution. One example of a rewards credit card account would be an account that bears the name of an airline, but is administered by a financial institution such as a bank. Specific product accounts 304 are then segmented in FIG. 3 into "non-revolvers" or accounts that tend to not carry a balance, at block 308, and "revolvers" at block 310.

The non-specific accounts, 306 in FIG. 3 are then further divided into three segments and an intermediate classification. The three segments represent non-product specific, inactive accounts, shown at block 312, non-product specific accounts that tend to have a high level of cash transactions as shown at block 314, and non-product specific accounts that tend to have a high level of balance transfer activity as shown at block 316. The intermediate group of active accounts, 318, form a segment of new, active accounts at block 320, and an intermediate group at block 322 of existing, active accounts. Some of the accounts in block 322 are then segmented into a thin, existing, active, segment as shown as block 324. Other accounts in block 322 are either not included in the segmentation, or are segmented by another method (see below).

It should be noted that segmentation according to embodiments of the invention can be accomplished by either of the previously described methods, other methods, or a combination of methods. Indeed, for the remainder of this disclosure, it can be assumed for the purposes of illustration that some segments are arrived at by clustering, and other segments are arrived at by using the waterfall approach. For example, returning to FIG. 3, the existing, active accounts in block 322, may include accounts that are simply segmented into the thin block, 324, and other accounts which are included in a clustering routine and thus would show up in clustered segments. In such a case, accounts are first divided into clustered and non-clustered sub-populations before segmentation takes place. Non-clustered accounts might be those which are awkward or difficult to cluster because there is too much or too little data pertaining to the various attributes. Accounts might also be non-clustered if they are strategic accounts for which special treatment is desired with respect to behavior modeling.

FIGS. 4, 5, 6, and 7 present flow chart style diagrams which illustrate some of the processes of an example embodiment of the present invention. For purposes of this example, it can be assumed that a financial institution has been contracted to use an external product to calculate scores. For example, the SCOREadvantage™ product previously mentioned can be used. In example embodiments, masterfile data already exists at the contractor, TSYS, or is communicated or created as is understood in the art. However, in example embodiments of the invention, masterfile attributes are combined with transaction attributes and credit bureau attributes to determine the custom behavior scores. All these types of attributes can be used in calculating the credit score. However, it would be possible to develop a scheme in which one or two types of attributes are used for segmentation.

Figure 4:
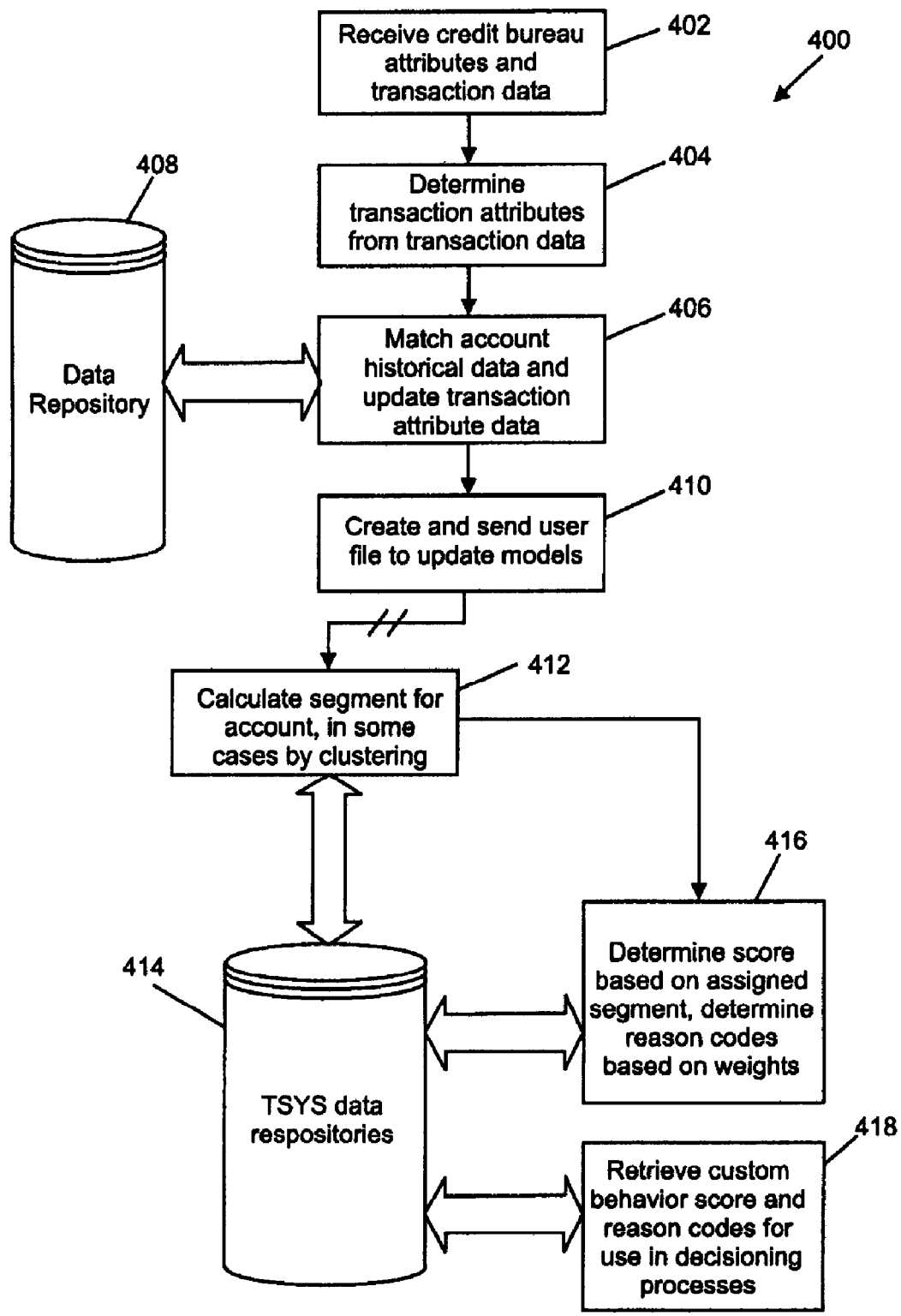
FIG. 4 is a flowchart illustrating a method of determining a custom behavior score according to some embodiments of the invention.

A flowchart illustrating the overall process 400, is shown in FIG. 4. As is typical, the sub-processes or elements are illustrated as process blocks. At least some of the process blocks access and make use of stored data. At block 402, credit bureau attributes and transaction data are received or retrieved by a system which is proceeding to update the segmentation and clustering so that behavior models can be updated. In many embodiments, credit bureau information can be received or retrieved in the form of attributes. However, transaction data can be received from existing financial systems in the form of raw data. At block 404, such transaction data is converted to transaction attributes. For example, actual, settlement information needs to be examined to determine if carried balances are enough to convert an account to a revolver, or how much of the total percentage of activity represents certain types of purchases. At block 406, historical data is matched with the new transaction attribute data, so that the attribute data can be updated. Data is maintained over time in data repository 408. Thus, behavior models are based not only on the most recent attributes, but also on the attributes over time for each account. Further detail on aggregating new attributes with historical attributes is provided in discussions of some of the other flowcharts.

At block 410, in this example embodiment, a user file or user file data, as is known in the SCOREadvantage™ system, is created to update the custom behavior scoring models in the scoring system. As previously discussed, masterfile data can be provided to the scoring process in the manner of the prior art. However, transaction attributes and credit bureau attributes can be input to the models at more frequent intervals, as desired by a user of an embodiment of the invention. Thus, the updating of the custom behavior models can occur quarterly, weekly, monthly, on demand, or, even every time a new score is requested for an account. At block 412 of FIG. 4, the segmentation process takes place, and the account on which the loan is to be taken or the proposed new account, is placed in the appropriate segment to have an updated, custom behavior model applied. In example embodiments, the scoring system accesses information in the user file as well as existing masterfile information in order to update the numerical values in the models and perform the segmentation, and if necessary, the clustering processes. Model data, masterfile data, and updated user files are maintained in data repositories in the scoring system, in this example at TSYS, as shown at 414. Using the appropriate behavior model for the segment into which the account falls, a score is determined at block 416. Optionally, reason indication codes can be derived for the score, by determining which attributes contributed the most to the custom behavior score. At block 418, the custom behavior score, and reason indications or codes, if the system is set up to provide them, can be accessed and used by financial systems within the lending institution. These financial systems may include branch terminals, management computing systems, planning tools, and any other data processing systems typically used in running the loan businesses of a financial enterprise. Records of this activity can be posted to data repositories 414 affiliated with the scoring system.

Figure 5:
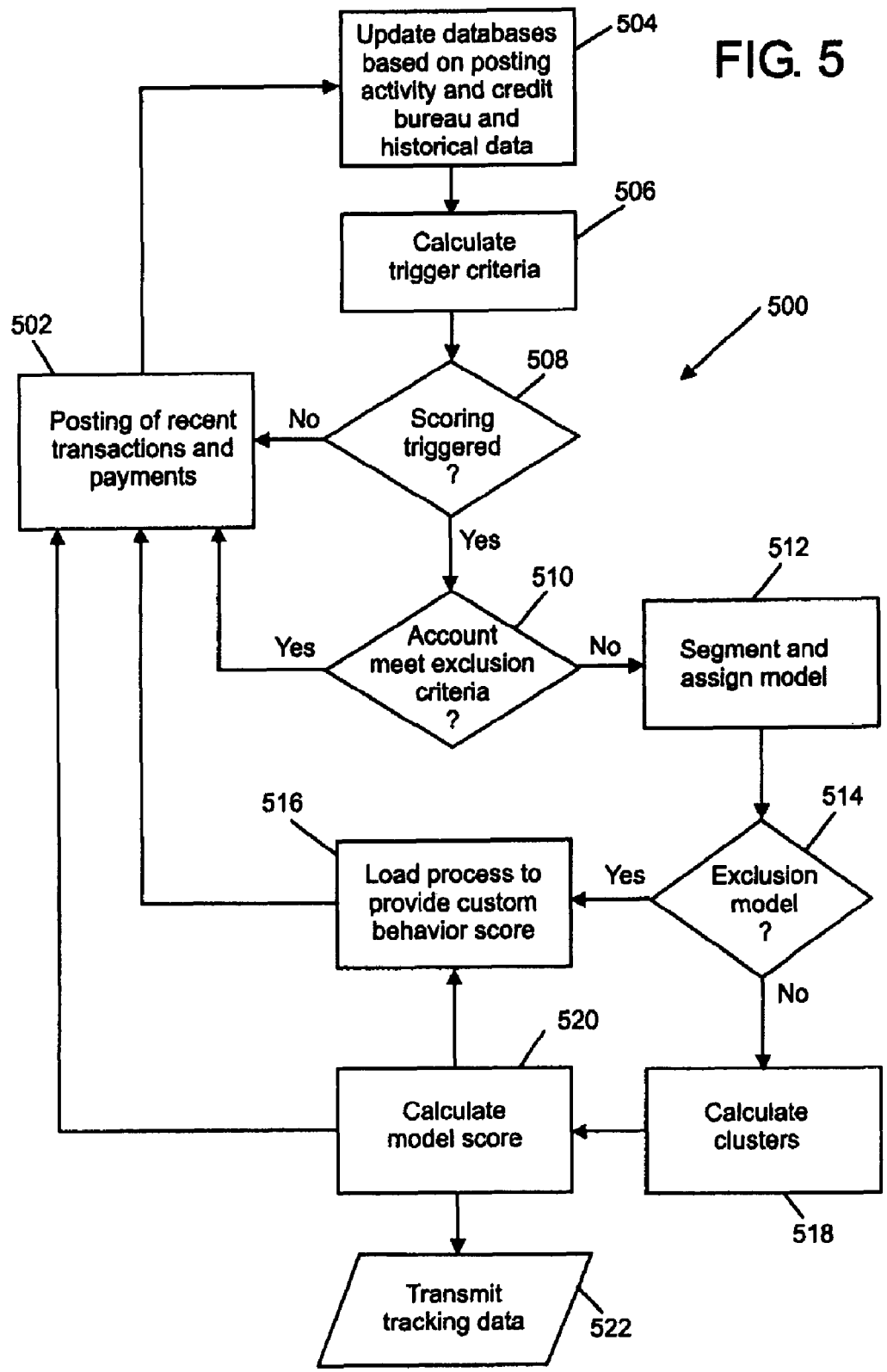
FIG. 5 is a flowchart illustrating further detail of the method of determining a custom behavior score according to at least some embodiments of the invention.

FIG. 5 is a flowchart illustrating details of scoring process 500 according to example embodiments of the invention. At block 502 posting activity takes place. An account enters posting to update transaction activity including recent sales transactions and financial payments. Note that in some cases, the system, which records and tracks posting activity may be maintained by a third party contractor. For example, TSYS, in addition to providing scoring services, maintains transaction posting systems for various financial institutions. Scoring databases are updated with transaction attributes based on recent transactions at block 504. Credit bureau information may also be updated, typically by being retrieved or accessed directly at the appropriate credit bureaus or credit reporting agencies. At block 506, a determination is made as to whether a scoring is triggered for the account. In some embodiments, re-scoring of an account can be triggered by events such as the closing of a quarter, the closing of a statement cycle, or certain transactions taking place. Otherwise, scoring can be triggered by request from the financial institution. Decision block 508 branches back to continuous posting process 502 if scoring has not been triggered. However, if scoring has been triggered, the account can be tested at block 510 to determine if it meets criteria to be excluded from the custom behavior scoring and modeling which has been discussed herein. If the account meets any of the high level exclusion criteria at block 510, processing returns to the continuous posting and updating activity. Exclusion criteria might include such items as whether the account has had too little or too much activity during a specific time period to be scored, whether it is a special account that is exempt from the normal credit decisioning process, or any other criteria that is desired by the financial institution.

If an account does not meet high-level exclusion criteria at block 510 of FIG. 5, the account is tested to determine its segmentation and to assign it a behavior model at block 512. At block 514, a decision is made as to whether the account is to be segmented based on a model that excludes the clustering process. For example, the exclusion model can be the waterfall process previously discussed. If the account falls into a non-clustered segment, and thus is excluded from the clustering calculation, a custom behavior score can be provided by the appropriate model through the load process at block 516. Otherwise, the clustering process takes place at block 518.

At block 518 of FIG. 5, the account is tested for adequacy of transaction, credit bureau, and masterfile information and possibly other factors. A clustered account is ultimately assigned a cluster number and assigned a custom behavior model for scoring. The clustering routine updates the clusters, and an account is tested for its nearness to one of the clusters. The account is assigned to a cluster based on the minimum distance calculated during the cluster segmentation routine. The account is assigned a custom behavior model based on the cluster assignment. At block 520, an account receives a unique custom behavior credit score, which reflects masterfile attributes, credit bureau attributes, transaction attributes or combinations of attributes. All these attributes are reflected in the custom behavior score since they are all included in the custom behavior model and/or segmentation process. This score, and any reason indication codes or other information desired to be included and reported, is passed on to the load process, 516. Optionally, this information can be passed to other tracking systems within the financial institution to monitor the scoring process, as shown at 522.

The load process as illustrated at 516 of FIG. 5 includes the updating of appropriate fields within records accessed by decisioning systems within the financial institution. A record can be updated or created to hold the final custom behavior score. Scores may also be loaded into account information databases. Loading can also include placing the scores and attributes, which lead to them in an appropriate historical database for continuous use by an institution implementing embodiments of the invention. In some cases, scripts may be executed to allow decisioning systems to access the custom behavior score information and present it in the appropriate format for each type of decisioning system within the financial institution which requires access to the information.

Figure 7:
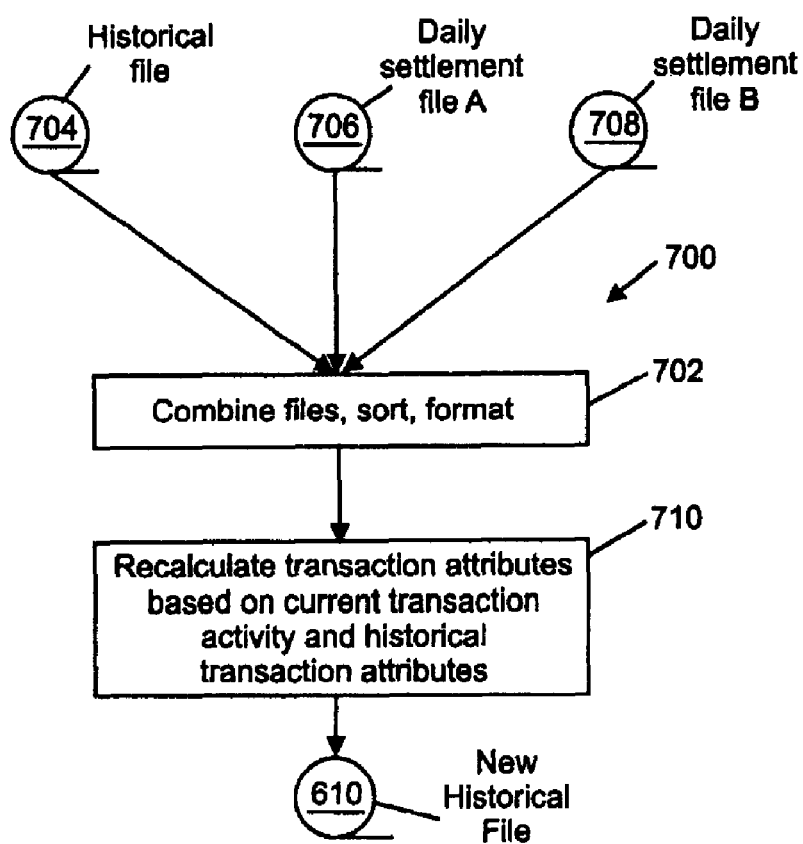
FIG. 7 is a flow diagram that shows how transaction attributes are updated according to at least some embodiments of the invention.

FIGS. 6 and 7 are flow diagrams which illustrate how credit bureau and transaction attribute information can be maintained and updated to support embodiments of the invention. FIG. 6 illustrates a process 600, for aggregating and formatting the information for use in scoring. Raw transaction information 602 is received at block 604. The transaction file is checked for errors and appropriate formatting. At block 606 the transaction information is sorted to facilitate matching to the historical data in the appropriate data repository. At block 608, a file of new historical information, 610, is matched with raw transaction information from the incoming transaction file, and together transaction attributes are updated. At block 612, credit bureau data, 614, is appended and the historical database is updated appropriately. At block 616, an output record containing credit bureau and transaction attributes is formatted and sent to the scoring system. In some embodiments, the file takes the format of user file data and is sent over a network, as shown at 618. The network may be internal to the financial institution, or an external network, such as the Internet. In the latter case, data can be secured via encryption, use of virtual private network (VPN) connections, etc., as is known in the art.

FIG. 7 illustrates how the new historical file, 610 of FIG. 6, can be obtained in some example embodiments of the invention. In the particular example of FIG. 7, transaction attributes can be determined using settlement information from two different servers, for example a server platform "A" and a server platform "B". Process 700 of FIG. 7 begins with the combining, sorting, and formatting of the files as shown at block 702. The files involved include an existing historical file of transaction attributes for all active accounts, 704, a file of daily settlement information from the "A" platform, 706, and a file of daily settlement information from the "B" platform, 708. Once the files are combined, sorted and formatted, the transaction attributes are recalculated based on the current transaction activity and the historical transaction attributes, as shown at block 710. The result is the new historical file, 610, which is the same file illustrated at 610 of FIG. 6.

FIGS. 8 and 9 provide graphical illustrations of the nature and format of custom behavior models which can be developed in accordance with embodiments of the invention. As previously discussed, the particular attributes taken into account for each particular type of loan and institution will vary dramatically, and thus only simple custom behavior models with a small number of attributes are shown for illustrative purposes. Even for these attributes, the numerical values that enable the model to calculate a custom behavior score change continuously and will vary greatly, and so no specific point values, weights, or rates are shown for the attributes. FIG. 8 illustrates portions of a custom behavior model for a non-clustered segment of accounts. For clarity, FIG. 8 is divided into FIGS. 8A, 8B and 8C. Custom behavior model 800 is presented as columns and rows, and has a format similar to traditional, generic scorecards as previously discussed. Turning to FIG. 8A, column 802 contains a name and/or description of the particular attribute in question. Column 804 contains a listing of the various intervals within an attribute that can have specific point values, rates, weights, etc. assigned. Column 806 lists point values assigned to each interval for a particular attribute. In each case, the point value represents the number of points to be added or subtracted from a score when the account attribute falls in the listed interval. Column 808 provides a population distribution for that attribute for the segment to which the model applies. Column 810 indicates the average for all accounts, or the expected value for that attribute for the particular segment. Column 812 lists the interval bad rate for the particular interval of the particular attribute. The interval bad rate is defined the same way it is with traditional scorecards. Column 814 provides a weighted percentage which indicates how much explanatory power is provided for a given interval of a given attribute. The explanatory power is an indication of how much that attribute contributes to the understanding as to whether an account is good or bad. Any number of statistical measures can be used to provide this indication, one example, would be to use the variance $r^2$.

The portion of the custom behavior model illustrated in FIG. 8A contains two sections. The first section is represented by row 816, and indicates a constant point value to be automatically added to each score. The constant in this example is the intercept of the regression line, as is understood in the art. The next section of the custom behavior model included in FIG. 8A is the masterfile information. In this particular example, the masterfile information includes two attributes. The attribute shown in row 818 is the ratio of current balance to credit limit in the most recent cycle. This attribute can fall into one of seven possible intervals, as shown. The attribute can be missing, or have a negative ratio. Otherwise, it can break down into five percent intervals as illustrated. Row 820 shows the masterfile attribute of the ratio of payment in the last three cycles to a balance 2-4 cycles previous. The first two intervals for this masterfile attribute indicate missing payments, and where a balance is less than or equal to zero (when a credit is due the consumer). Otherwise, this attribute breaks down in to four percentage intervals as shown. Note that for each attribute, both in the masterfile section and in other sections of the model, there is a "total" row. For each attribute, the population distribution column of this row of the model contains the sum total of the values for all of the intervals listed above it. For example, if population distribution is expressed as a percentage, the population distribution total for an attribute is normally 100 percent. In this example, for the next column of the total row, the "total" average points is the "expected value" for that attribute, which is the sum-product of the population distribution times the assigned points.

FIG. 8B shows the next section of the example model for a non-clustered segment illustrated in FIG. 8. FIG. 8B illustrates the section of the model which shows attributes derived from or contained in credit bureau information. The attribute in row 822 is the number of credit bureau inquiries for the account holder received at the credit bureau in the last 12 months. Credit bureau inquires is an indication of a customer's credit desires; normally, fewer inquires is a better risk indicator. This attribute is divided into eight intervals. Row 824 in the credit bureau information section lists the attribute of the number of months since the account has experienced a past due trade more the 30 days past due (30 DPD). An account having no past delinquencies recorded on its bureau is classified as not meeting the criteria (no past delinquencies), where 0 indicates a very recent occurrence, etc.

FIG. 8C illustrates a section of the non-clustered custom behavior model 800 that is dedicated to transaction attribute data. The attribute shown in row 826 is the percent of total transaction amount in the past six cycles related to convenience checks. "No Transaction" indicates an account that does not have the necessary information to create the attribute, e.g. cannot divided by zero. The 0% indicates the account has had transaction activity, but none of this type. The second example attribute shown in FIG. 8C appears in row 828 of the custom behavior model. This attribute is the amount of high-level cash transactions in the past six cycles. The interval breakdown illustrated in FIG. 8C is self-explanatory. A "high-level" cash transaction, as is understood in the art, is typically defined as a transaction involving actual currency, as opposed to "near currency" such as convenience checks, gambling chips, money orders, etc.

FIG. 9 graphically illustrates example portions of a custom behavior model for a clustered segment, as might be used with embodiments of the invention. FIG. 9 is divided into FIGS. 9A, 9B, and 9C for clarity. Custom behavior model 900 includes the same columns as discussed with respect to the model of FIG. 8, and so no further explanation of the columns is required.

FIG. 9A, as before, includes two sections, a constant section shown in row 916, and a masterfile information section. The masterfile information includes an attribute shown in row 919, which is the ratio of average payment to balance in the last six cycles. The masterfile attribute shown in row 920 of FIG. 9A is the ratio of balance to credit limit in the last six cycles. This masterfile attribute is expressed as a percentage, and is divided into five intervals, beginning with an interval for accounts that have a missing ratio, up to an interval where the ratio is 45 percent or more.

FIG. 9B and the first portion of FIG. 9C illustrate the credit bureau attributes section of custom behavior model 900. The attribute shown in row 922 is the same as that shown in row 822 of FIG. 8. The credit bureau attribute shown in row 925 of FIG. 9B is an attribute for the age of the oldest trade on the account. Of all the trades recorded on the customer's credit bureau, this is a proxy for the customers "credit experience"/maturity. This attribute assumes trades exist, but the negative breaks indicate different situations indicating that while a credit file exists, there are no trades on the file. As an example, "−5 Inquiries Only" is a bureau file having no trades (inquires only) and thus no "oldest trade"; the "−5" is a way of numerically coding this for the model.

In addition to some of the data from the credit bureau attributes section continued from FIG. 9B, FIG. 9C illustrates the transaction attribute data section of custom behavior model 900. The attribute shown in row 927 is the number of travel and entertainment (T&E) transactions in the past six cycles. The attribute shown in row 929 is the number of high level frivolous transactions in the past six cycles. All transactions of an account are classified into broad transactions type groups using merchant category codes, with such labels as frivolous, necessity, travel and entertainment, etc. The number of frivolous transactions is the count of this type occurring over the last six billing cycles (usually, months).

Figure 10:
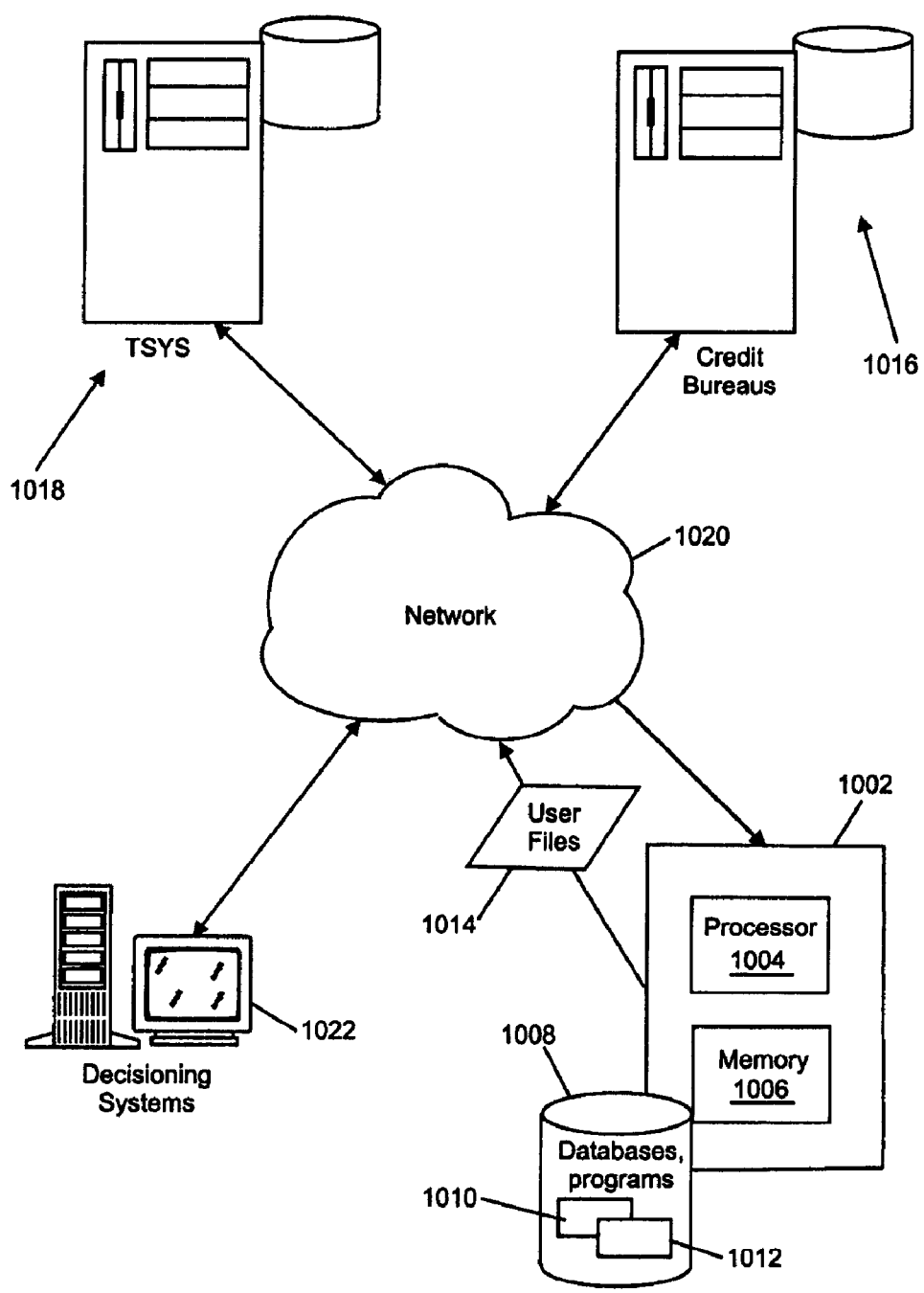
FIG. 10 shows an example system where various hardware apparatus execute computer program code and store data to enable at least some embodiments of the invention.

FIG. 10 is a block diagram illustrating one example operating environment for the present invention. Processing platform 1002 can include one or more processors, 1004, and a certain amount of memory, 1006. Such a processing platform typically has associated with it storage 1008 for the appropriate databases or data repositories, as shown at 1010, and computer programs or computer program code as shown at 1012. Processing platform 1002 may reside at the financial institution or with a contractor. In the example of FIG. 10, processing platform 1002 and the affiliated storage and computer program code and database elements are used to aggregate and maintain historical data, transaction attribute information, credit bureau data, etc. This processing platform can also direct the updating and creation user files or user file information 1014 to update custom behavior models and cause the scoring of accounts, where a system like SCOREadvantage™ is used by the financial institution. In this example, processing platform 1002 can communicate with credit bureau systems 1016 and the TSYS scoring system 1018. Communication can take place over network 1020, which may be via virtual private networking (VPN) or other encrypted connections over the Internet, or via private networking facilities. Decisioning systems 1022 can access scoring information as needed. These decisioning systems may reside, for example, at financial institution branches, management offices, or technical and operation centers. Decisioning systems may include customer service systems, loan application systems, collection systems and tracking systems.

As previously discussed, it should be noted that computer program code in the form of various computer program instructions can be used to implement at least portions of the processes involved in carrying out embodiments of the invention. Such computer program code can be supplied via a computer program product containing all or a portion of the computer program instructions stored on a media. The media may be fixed, or removable. Such a media is conceptually illustrated at 1008 of FIG. 10 as a fixed storage media, but it could just as easily be a removable optical or magnetic disc or tape. The computer program instructions can reside on any medium that can contain, store, communicate, propagate, or transport computer program code for execution by any type of computing platform, instruction execution system, or collection of such systems interconnected via a buss or network. Such a computer readable medium may be, for example, but not limited to, an electronic, magnetic, optical, electromagnetic, infrared, or semiconductor system or device. Computer program instructions which implement all or a portion of the invention may also be embodied in a stream of information being retrieved over a network such as the Internet. Note that the computer usable or computer readable medium could even be paper or another suitable medium upon which computer program code is printed, as the code can be electronically captured via, for instance, an optical scan, then compiled and interpreted, or otherwise processed in a suitable manner.

Note also that in the example embodiment of FIG. 10, computer program code that actually performs the scoring calculations resides at the TSYS system, 1018. However, all of the computer program code involved in carrying out the processes described herein can reside with one party, or on a single system. This would be the case for example if a financial institution wished to have complete control of the scoring process.

Specific embodiments of an invention are disclosed herein. One of ordinary skill in the computing and financial arts will quickly recognize that the invention has other applications in other environments. Many embodiments are possible. The following claims are in no way intended to limit the scope of the invention to the specific embodiments described above.

The invention claimed is:

1. A method of producing a custom behavior credit score for use in credit decisioning for an account at a financial institution, the method comprising:

assigning an account to a segment from among a plurality of segments of accounts at the financial institution, wherein each of the plurality of segments of accounts have a different associated custom behavior model so that segmented accounts will have a different customer behavior score based on which segment each segmented account is assigned to, wherein each custom behavior model uses transaction attributes, masterfile attributes, and credit bureau attributes;

updating, by a computer hardware processor, the plurality of custom behavior models, each custom behavior model using masterfile attributes, credit bureau attributes, and transaction attributes, wherein the transaction attributes comprises data gathered through monitoring, over a period of time, patterns of transactional behavior of a customer, and wherein a different custom behavior model is associated with each of the plurality of segments of accounts at the financial institution; and determining the custom behavior credit score for the account from the custom behavior model associated with the segment to which the account is assigned, said custom behavior model using transaction attributes, masterfile attributes, and credit bureau attributes in determining the custom behavior score for the account, wherein at least some segments from the plurality of segments of accounts are determined by grouping accounts into a plurality of clusters based on Euclidean distance between points in a multidimensional space, wherein each point represents one of the plurality of accounts, and each dimension in the multidimensional space represents the transaction, credit bureau, and masterfile attributes, and wherein the assigning the account to a segment comprises determining a Euclidean distance for a point representing the account from a centroid for at least some of the plurality of clusters.

2. The method of claim 1 wherein the assigning the account to a segment further comprises testing the account to determine if it meets exclusion criteria.

3. The method of claim 2 further comprising determining at least one reason indication for the custom behavior credit score based on weights assigned to at least some of at least one of the masterfile attributes, credit bureau attributes, transaction attributes, or combinations thereof in the custom behavior model, the at least one reason indication providing what percentage each of the attributes contributed to the custom behavior credit score.

4. The method of claim 1 further comprising determining at least one reason indication for the custom behavior credit score based on weights assigned to at least some of at least one of the masterfile attributes, credit bureau attributes, transaction attributes, or combinations thereof in the custom behavior model, the at least one reason indication providing what percentage each of the attributes contributed to the custom behavior credit score.

5. The method of claim 1 further comprising determining at least one reason indication for the custom behavior credit score based on weights assigned to at least some of at least one of the masterfile attributes, credit bureau attributes, transaction attributes, or combinations thereof in the custom behavior model, the at least one reason indication providing what percentage each of the attributes contributed to the custom behavior credit score.

6. The method of claim 1 further comprising determining at least one reason indication for the custom behavior credit score based on weights assigned to at least some of at least one of the masterfile attributes, credit bureau attributes, transaction attributes, or combinations thereof in the custom behavior mode, the at least one reason indication providing what percentage each of the attributes contributed to the custom behavior credit score.

7. Apparatus for producing custom behavior credit scores for use in credit decisioning for accounts at a financial institution, the apparatus comprising:
means for assigning an account to a segment from among a plurality of segments of accounts at the financial institution, wherein each of the plurality of segments of accounts have a different associated custom behavior model so that segmented accounts will have a different customer behavior score based on which segment each segmented account is assigned to, wherein each custom behavior model uses transaction attributes, masterfile attributes, and credit bureau attributes;
means for updating the plurality of custom behavior models, each custom behavior model using masterfile attributes, credit bureau attributes, and transaction attributes, wherein the transaction attributes comprises data gathered through monitoring, over a period of time, patterns of transactional behavior of a customer, and wherein a different custom behavior model is associated with each of the plurality of segments of accounts at the financial institution;
means for determining the custom behavior credit score for the account from the custom behavior model associated with the segment to which the account is assigned, said custom behavior model using transaction attributes, masterfile attributes, and credit bureau attributes in determining the custom behavior score for the account, and means for determining a Euclidean distance for a point representing the account from a centroid for at least some of a plurality of clusters, wherein each cluster is determined based on Euclidean distance between points in a multidimensional space, wherein the points correspond to accounts and each dimension in the multidimensional space represents at least one of transaction, credit bureau, or master file attributes wherein at least some segments from the plurality of segments of accounts are determined by grouping accounts into a plurality of clusters based on Euclidean distance between points in a multidimensional space, wherein each point represents one of the plurality of accounts, and each dimension in the multidimensional space represents the transaction, credit bureau, and masterfile attributes, and wherein the assigning the account to a segment comprises determining a Euclidean distance for a point representing the account from a centroid for at least some of the plurality of clusters.

8. The apparatus of claim 7 further comprising means for testing the account to determine if it meets exclusion criteria.

9. The apparatus of claim 8 further comprising means for determining at least one reason indication for the custom behavior credit score based on weights assigned to at least some of at least one of the masterfile attributes, credit bureau attributes, transaction attributes, or combinations thereof in the custom behavior model, the at least one reason indication providing what percentage each of the attributes contributed to the custom behavior credit score.

10. The apparatus of claim 7 further comprising means for testing the account to determine if it meets exclusion criteria.

11. The apparatus of claim 10 further comprising means for determining at least one reason indication for the custom behavior credit score based on weights assigned to at least some of at least one of the masterfile attributes, credit bureau attributes, transaction attributes, or combinations thereof in the custom behavior model, the at least one reason indication providing what percentage each of the attributes contributed to the custom behavior credit score.

12. The apparatus of claim 7 further comprising means for determining at least one reason indication for the custom behavior credit score based on weights assigned to at least some of at least one of the masterfile attributes, credit bureau attributes, transaction attributes, or combinations thereof in the custom behavior model, the at least one reason indication providing what percentage each of the attributes contributed to the custom behavior credit score.

13. The apparatus of claim 7 further comprising means for determining at least one reason indication for the custom behavior credit score based on weights assigned to at least some of at least one of the masterfile attributes, credit bureau attributes, transaction attributes, or combinations thereof in the custom behavior model, the at least one reason indication providing what percentage each of the attributes contributed to the custom behavior credit score.

14. A computer program product comprising a non-transitory computer-readable storage medium having computer program code embodied therein for enabling the production of custom behavior credit scores for use in credit decisioning for accounts at a financial institution, the computer program code comprising:
instructions for assigning an account to a segment from among a plurality of segments of accounts at the financial institution, wherein each of the plurality of segments of accounts have a different associated custom behavior model so that segmented accounts will have a different customer behavior score based on which segment each segmented account is assigned to, wherein each custom behavior model uses transaction attributes, masterfile attributes, and credit bureau attributes;

instructions for updating the plurality of custom behavior models, each custom behavior model using masterfile attributes, credit bureau attributes, and transaction attributes, wherein the transaction attributes comprises data gathered through monitoring, over a period of time, patterns of transactional behavior of a customer, and wherein a different custom behavior model is associated with one of the plurality of segments of accounts at the financial institution;

instructions for determining a custom behavior credit score for the account from the custom behavior model associated with the segment to which the account is assigned, said custom behavior model using transaction attributes, masterfile attributes, and credit bureau attributes in determining the custom behavior score for the account;

wherein the computer program code further comprises instructions for determining a Euclidean distance for a point representing the account from a centroid for at least some of a plurality of clusters, wherein each cluster is determined based on Euclidean distance between points in a multidimensional space wherein the points cones and to accounts and each dimension in the multidimensional space represents at least one of transaction, credit bureau, or master file attributes.

15. The computer program product of claim 14 wherein the computer program code further comprises instructions for testing the account to determine if it meets exclusion criteria.

16. The computer program product of claim 15 wherein the computer program code further comprises instructions for determining at least one reason indication for the custom behavior credit score based on weights assigned to at least some of at least one of the masterfile attributes, credit bureau attributes, transaction attributes, or combinations thereof in the custom behavior model, the at least one reason indication providing what percentage each of the attributes contributed to the custom behavior credit score.

17. The computer program product of claim 14 wherein the computer program code further comprises instructions for testing the account to determine if it meets exclusion criteria.

18. The computer program product of claim 17 wherein the computer program code further comprises instructions for determining at least one reason indication for the custom behavior credit score based on weights assigned to at least some of at least one of the masterfile attributes, credit bureau attributes, transaction attributes, or combinations thereof in the custom behavior model, the at least one reason indication providing what percentage each of the attributes contributed to the custom behavior credit score.

19. The computer program product of claim 14 wherein the computer program code further comprises instructions for determining at least one reason indication for the custom behavior credit score based on weights assigned to at least some of at least one of the masterfile attributes, credit bureau attributes, transaction attributes, or combinations thereof in the custom behavior model, the at least one reason indication providing what percentage each of the attributes contributed to the custom behavior credit score.

20. The computer program product of claim 14 wherein the computer program code further comprises instructions for determining at least one reason indication for the custom behavior credit score based on weights assigned to at least some of at least one of the masterfile attributes, credit bureau attributes, transaction attributes, or combinations thereof in the custom behavior model, the at least one reason indication providing what percentage each of the attributes contributed to the custom behavior credit score.

21. A system for producing custom behavior credit scores for use in credit decisioning for accounts at a financial institution, the system comprising:

apparatus to store and update masterfile attributes, credit bureau attributes and transaction attributes, wherein the transaction attributes comprises data gathered through monitoring, over a period of time, patterns of customer's transactional behavior;

apparatus to produce a plurality of custom behavior models, wherein each custom behavior model is associated with one of the plurality of segments of accounts at the financial institution, each custom behavior model using the masterfile attributes, credit bureau attributes, and transaction attributes; and apparatus to assign an account to a segment from among the plurality of segments of accounts at the financial institution, wherein each segment of the plurality of segments of accounts corresponding to different custom behavior models so that segmented accounts will have a different customer behavior score based on which segment each segmented account is assigned to, and to determine a custom behavior credit score for the account from the custom behavior model associated with the segment to which the account is assigned, said custom behavior model using transaction attributes, masterfile attributes, and credit bureau attributes in determining the custom behavior score for the account wherein the apparatus to produce the plurality of custom behavior models is operable to determine at least some segments from the plurality of segments of accounts by grouping accounts into a plurality of clusters based on Euclidean distance between points in a multidimensional space, wherein each point represents an account, and each dimension in the multidimensional space represents at least one of transaction, credit bureau, or master file attributes, and wherein the assigning the account to a segment comprises determining a Euclidean distance for a point representing the account from a centroid for at least some of the plurality of clusters.

22. The system of claim 21 wherein the apparatus to produce the plurality of custom behavior models is operable to determine at least some segments from the plurality of segments of accounts by grouping accounts into a plurality of clusters based on Euclidean distance between points in a multidimensional space, wherein each point represents an account, and each dimension in the multidimensional space represents at least one of transaction, credit bureau, or master file attributes.

23. The system of claim 22 wherein the apparatus to assign the account to a segment is operable to determine a Euclidean distance for a point representing the account from a centroid for at least some of the plurality of clusters.

* * * * *

UNITED STATES PATENT AND TRADEMARK OFFICE
CERTIFICATE OF CORRECTION

PATENT NO.       : 8,065,227 B1
APPLICATION NO.  : 10/709797
DATED            : November 22, 2011
INVENTOR(S)      : Dennis G. Beckmann Page 1 of 1

It is certified that error appears in the above-identified patent and that said Letters Patent is hereby corrected as shown below:

Cover Page: Item 75
The named inventor appears on the Letters Patent as Dennis G. Beckman, it should read Dennis G. Beckmann.

Signed and Sealed this
Twenty-fourth Day of January, 2012

David J. Kappos
*Director of the United States Patent and Trademark Office*